June 24, 1930. E. WECKER 1,766,863
SEPARATING SUBSTANCES OF DISSIMILAR VOLATILITIES
Filed July 23, 1926 7 Sheets-Sheet 1

June 24, 1930.  E. WECKER  1,766,863
SEPARATING SUBSTANCES OF DISSIMILAR VOLATILITIES
Filed July 23, 1926  7 Sheets-Sheet 2

June 24, 1930. E. WECKER 1,766,863
SEPARATING SUBSTANCES OF DISSIMILAR VOLATILITIES
Filed July 23, 1926 7 Sheets-Sheet 3

June 24, 1930.  E. WECKER  1,766,863
SEPARATING SUBSTANCES OF DISSIMILAR VOLATILITIES
Filed July 23, 1926  7 Sheets-Sheet 4

Inventor:
E. Wecker

June 24, 1930.  E. WECKER  1,766,863
SEPARATING SUBSTANCES OF DISSIMILAR VOLATILITIES
Filed July 23, 1926   7 Sheets-Sheet 5

Patented June 24, 1930

1,766,863

UNITED STATES PATENT OFFICE

ERNST WECKER, OF HEILBRONN, GERMANY

SEPARATING SUBSTANCES OF DISSIMILAR VOLATILITIES

Application filed July 23, 1926, Serial No. 124,520, and in Germany March 17, 1926.

A previous application of the applicant, Ser. No. 699,137 of March 13th, 1924, #1,-622,126, of March 22, 1927, deals with a process in which volatile substances are separated from those which are less volatile and in which for example fatty acids or substances imparting a taste or an odour to oils or fats are removed, or again in which volatile substances are removed from tars, tar oils, mineral oils, etc. To this end, the material to be treated is heated to a high temperature in as high a vacuum as possible, whereafter suitable liquids (such as for example water, toluol, alcohol or any other vaporizable liquid) are supplied to the said material in a state of fine division and preferably as a mist, for example in the form of wet saturated vapour. Carriers for the finely divided liquids may be neutral gases, for example carbon dioxide and nitrogen, saturated or superheated vapours, or mixtures of such carriers. The separation and removal of volatile substances from the material under treatment is substantially based upon the circumstance that the fine particles of liquid supplied to the said material are instantly vaporized under the action of intense expansion and are converted into superheated steam or vapour. The consequence of this intense and explosion-like vaporization of the particles of liquid is that the volatile substances such as for example fatty acids are instantly expelled from the mixture of substances under treatment.

This invention relates to further improvements in this process, the said improvements being useful for example for treating fats and oils such as edible oils and edible fats, for the soap industry and for similar purposes.

The invention moreover provides means for carrying out the process.

The essence of the invention is set forth hereunder with reference to the accompanying drawings showing two constructions of the new apparatus.

Figures 1, 2, 3:
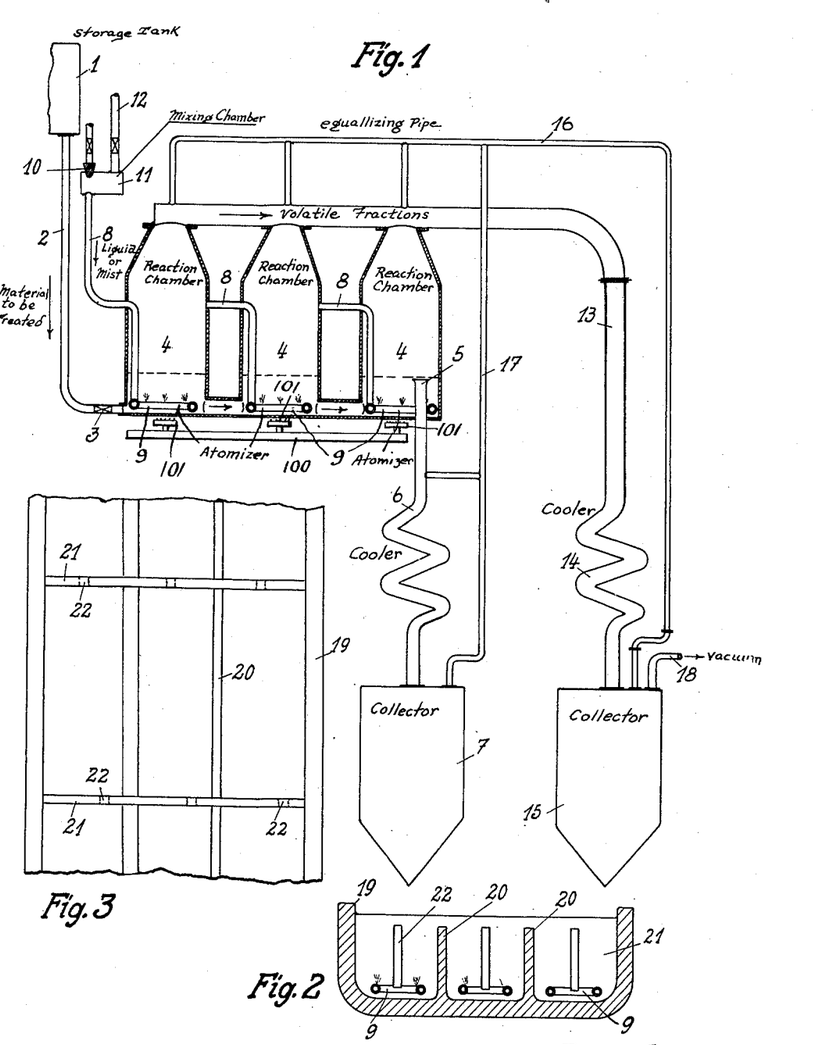
Figure 1 is a sectional diagrammatic view of one form of apparatus.
Figure 2 is a cross-sectional view of the bottom of chambers 4.
Figure 3 is a plan view of Figure 2 showing the bottom of the reaction chambers 4.

Referring more particularly to Figure 1, the material containing the volatile and non-volatile substances to be treated reaches the reaction chambers 4 from the storage tank 1 through a pipe 2 and an inlet valve 3. The material is heated in these chambers and after flowing from one chamber to the other runs from the overflow pipe 5 into a cooler 6 and thence into a collector 7.

The procedure for separating and removing the volatile constituents from the non-volatile substances is as follows: The liquid or mixture of liquids in the form of mist and the vapour-like or gaseous carriers enter the reaction chambers for example through the pipes 8 and after being dealt with by atomizing means 9 reach the suitably heated material lying in a vacuum. The liquid is formed into a mist and mixed with vapour-like or gaseous carriers in any suitable way, for example by forming the mist by means of atomizing nozzles 10 in a mixing chamber 11 and if necessary simultaneously mixed with the said carriers delivered to this chamber through the pipe 12. On entering the reaction chambers the particles of liquid sprayed therein instantly and violently expand in the highly heated oil or fat. The vapours of the volatile constituents thus freed flow through an outtake pipe 13 into the cooler 14 in which they are condensed and from which they flow in the liquid state (for example with the condensate of the mixture of liquid in the form of a mist) into a collector 15. All the essential elements of the apparatus, and more particularly those of large dimensions such as the reaction and collecting vessels, the coolers, etc. are in communication with one another through vacuum bridge-piping 16 and 17 for the purpose of causing the functions of the apparatus to progress evenly while oil is continuously flowing therethrough. The pipe 18 leads to a vacuum-producing device (not shown), for example a vacuum pump.

The reaction chamber is filled proportionally to the material to be treated and the number of such chambers should be preferably governed by the degree of volatility of the substances to be removed. The chambers should advantageously be as shown in Figures 2 and 3. Figure 2 is a section of a reaction vessel divided into compartments according to the present invention and Figure 3 is a plan thereof.

Figures 4, 5, 6:
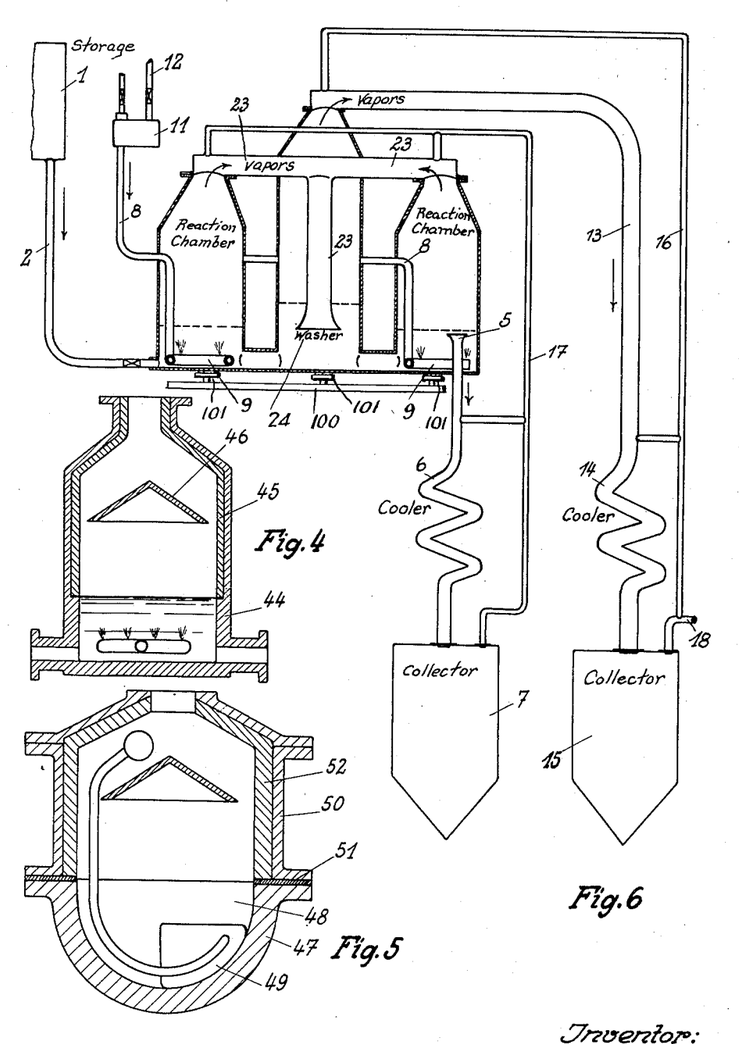
Figure 4 is a vertical cross-sectional view through a modified form of reaction chamber or vessel.
Figure 5 shows a vertical cross-section through another modification of the reaction chamber.
Figure 6 is a vertical, cross-sectional view of a modified form of apparatus showing the use of a scrubber or washer for the vapors.
Figure 7:
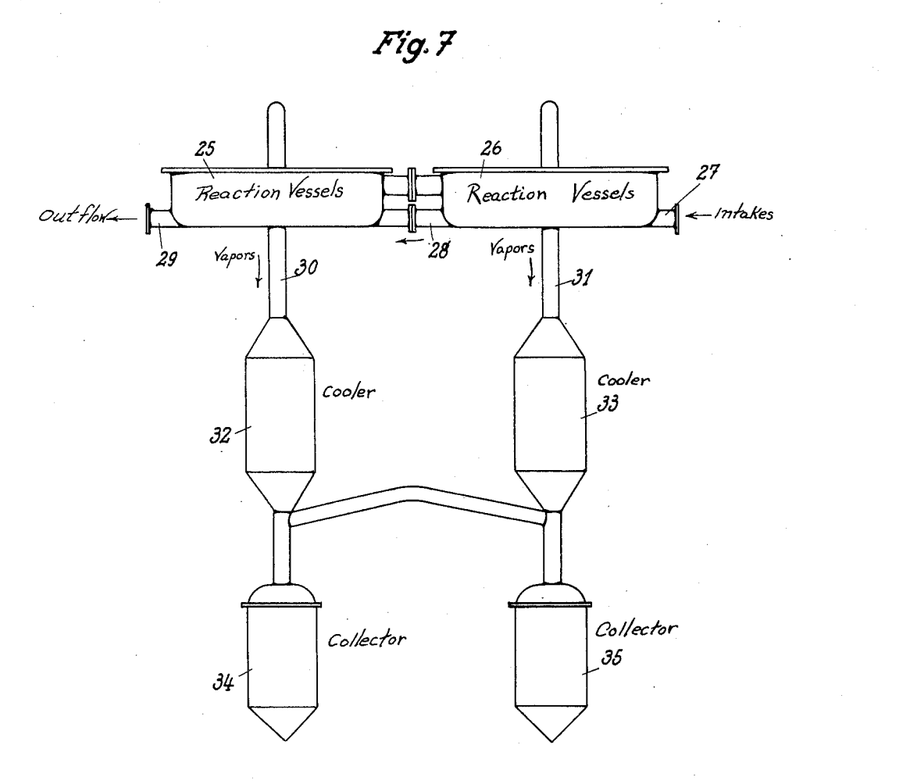
Figure 7 shows in elevation the arrangement of the reaction vessels, coolers, and collectors, Figure 8 in a vertical section shows an advantageous type of preheater to use for preheating oils to be treated.

The reaction vessel has walls 19 and is divided by longitudinal ribs 20 and cross-ribs 21 into a number of compartments in which the oil flows through apertures 22 preferably somewhat out of alignment with one another. The ribs may for example be corrugated or provided with small projections, as shown in Figures 2 and 3. The lower wall or floor of the vessel, heated externally, or internally heated by electricity, is preferably thick and made of particularly good heat-conducting metals such as aluminium or its alloys, so that the heat should be evenly divided. Moreover the metal or more accurately the inner face of the apparatus is for preference chemically inert as regards oils and fatty acids. In certain circumstances polymerization effects are observed on the upper portion of the metal faces in contact with the vapours when the apparatus is worked on practical lines. This disadvantage may be obviated by lining the said upper portion with inert material of low heat conductivity. For example, a ceramic facing or a lining of quartz glass would fulfil the purpose. Referring to Figure 4 the portion of the wall 44 of the reaction vessel above the level of the oil is provided with a layer 45 of material of low conductivity. The reaction chamber has also a spray-arresting device 46.

The reaction vessel according to Figure 5 is constituted by a lower portion 47 in contact with the heating means and divided into a number of reaction compartments for example by transverse partitions 48 having transfer apertures 49. The upper portion 50 is secured to the lower portion 47, for example with the aid of a flange connection 51 and packing gaskets. The said upper portion may be provided with a lining 52 of insulating material.

A further improvement in the process carried out in the apparatus according to this invention results from the endeavour of the inventor to remove almost completely the volatile constituents (for example the fatty acids) from the material with which the invention is concerned. If for example vegetable oils containing free fatty acids are treated according to the present process, neutral oil is carried away in the form of vapours as the proportion of fatty acids decreases as a result of the oil being gradually deprived of the said acids from one reaction chamber to the other. For example, oils having a high proportion of fatty acids yield vapours containing almost 100% of such acids, whereas oils in which these acids are below 2 to 3% yield vapours containing an increasing amount of neutral oil. The inventor has found that the particles of neutral oil in these vapours can be recovered almost quantitatively by scrubbing these vapours in heated oils having a high percentage of fatty acids or in fatty acids alone, so that the vapours are solely those of such acids.

To this end, the vapours may for example be scrubbed in a separate washer or scrubber, see Figure 6, disposed for example behind the apparatus of Figure 1 and traversed by suitably heated oil having a high proportion of fatty acids. Another method of proceeding is to return the whole or part of the vapours (more particularly those issuing from the last element of the apparatus) to one of the front elements thereof, for example to the first reaction chamber or to a vessel disposed before the said apparatus and containing oil with a suitably high percentage of fatty acids.

The scrubbing process is preferably carried out with the aid of the apparatus illustrated by way of example in Figure 6 in which the reference numerals 1 to 18 indicate the same elements as in Figure 1. The whole of the outflowing vapours are led through pipes 23 to a separate scrubber or washer 24 in which the said vapours are freed from their particles of neutral oil by contact with oil having a high proportion of fatty acids, whereafter the said vapours flow through a pipe 13 to the cooler 14 and thence to the collector 15. The scrubber 24 is preferably disposed in the row of reaction chambers so that it is traversed by the oil passing through the said chambers. The scrubber is preferably disposed at the front end of the apparatus, i. e. at a point at which the crude oil has reached the reaction temperature but has not given off any fatty acids or has hardly done so.

The various elements of the apparatus may if necessary be disposed as in Figure 5 in which two reaction vessels 25 and 26 arranged in tandem have an intake pipe 27, a transfer pipe 28 and an outflow pipe 29 for the crude oil. The vapours are separately discharged from the two vessels through pipes 30 and 31, condensed in coolers 32 and 33 and collected in the containers 34 and 35. The discharge being divided in this manner the condensate in the container 35 is extremely rich in fatty acids while the container 34 receives but a comparatively small amount of condensate with a low proportion of fatty acids, which may be returned to the raw material.

Figure 8:
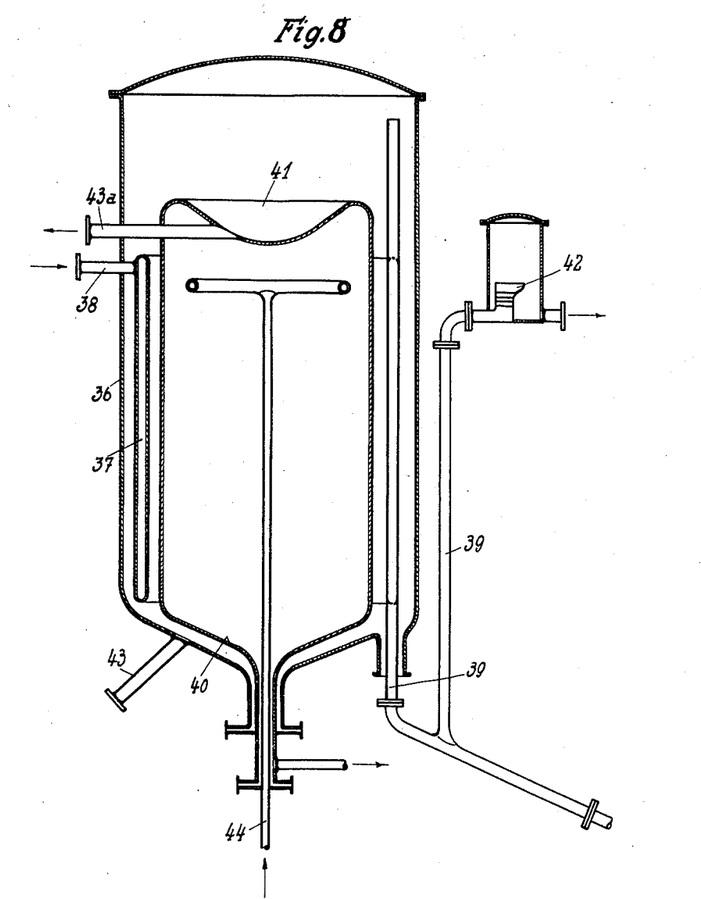

A further improvement of the process and apparatus described lies in the circumstance that the crude oil is heated before being subjected to treatment, the heat therefor being derived from the purified oil flowing out of the apparatus. Figure 8 illustrates pre-heating means suitable for this purpose. A vessel 36 which is for example cylindrical surrounds with a small intermediate space an annular cylindrical chamber 37, or a set of vertical tubes, or a tubular coil, fitted with an intake pipe 38, and an outtake pipe 39. The said annular chamber or tubes, or coil, surrounds (likewise with an intermediate space) a cylindrical receptacle 40 the cover or top of which is suitably cupped. The final oil product enters the apparatus through the pipe 38 and flows over the whole of the annular chamber 37. It leaves the apparatus through the pipe 39 and reaches the adjustable overflow 42 whence it flows to an oil receiver. The crude oil enters the lower portion of the outermost vessel through the pipe 43 and rises in the annular space formed between the said vessel and the innermost vessel 40. This space contains the annular cylindrical chamber 37 full of hot final oil, so that the crude oil is heated by the latter. The rising oil flows over the edge of the cup 41 into the latter and is thus de-gassed, whereafter it is led to the reaction chambers through the pipe 43ª. Steam or gas or exhaust gases or in other cases a cooling fluid may be supplied if necessary to the interior of the receptacle 40 from below and through the pipe 44, for the purpose of warming or cooling the said receptacle. The pre-heater may be suitably disposed for example between the storage tank 1 of Figure 1 or Figure 2 and the first reaction chamber. Should the reaction chambers be heated by direct contact with flames in place of being heated by steam, hot water or electrically, the combustion gases may be used for pre-heating the raw material.

The process may be carried into practice within wide limits in accordance with the nature of the material to be treated. To this end, the means for finely dividing the liquid supplied to the material are adjustable, so that the degree of division of the liquid (i. e. the fineness of the mist produced) and its proportion to the gaseous or vapour-like carrier simultaneously used may be varied to a great extent.

Figures 9, 10, 11, 12:
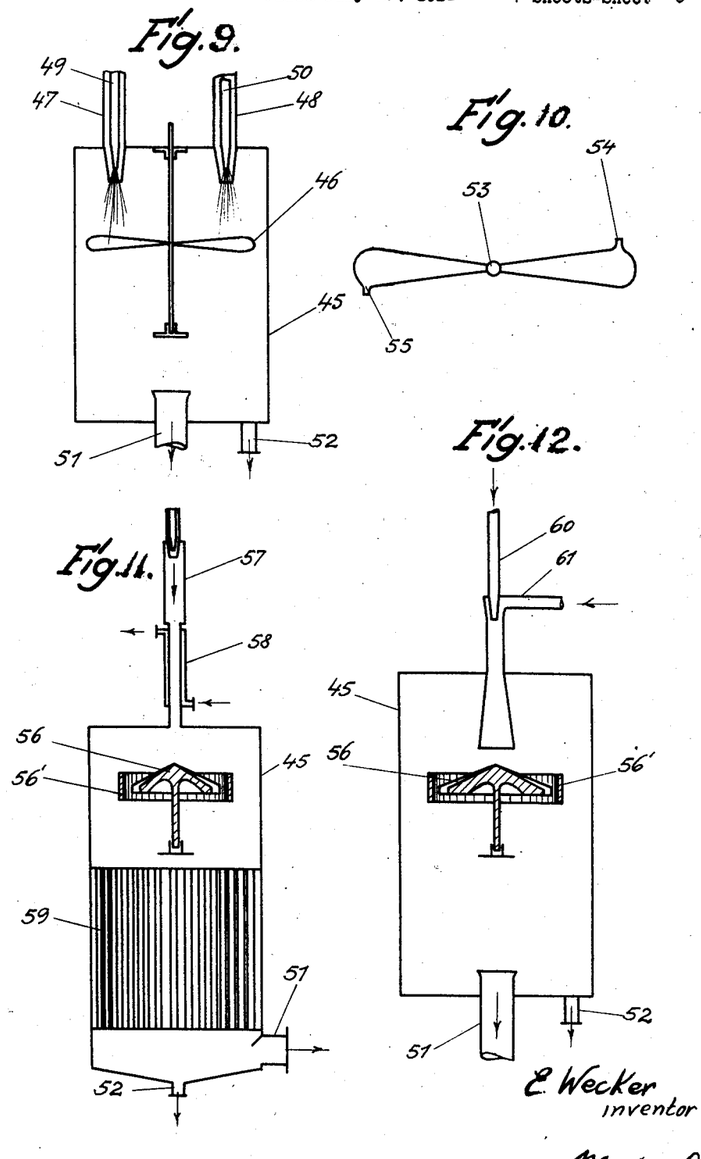
Figures 9 to 14 show diagrammatical views partly in section of suitable apparatus for atomizing liquids used to convert them into a mist.

Figures 9 to 14 illustrate a number of devices for producing and proportioning mixtures of finely divided liquids with gases or vapours according to this invention. Figure 9 shows a mist-producing or atomizing device in which the mixture of gas and liquid is projected upon a high-speed atomizing element, for example a bladed agitator. The container 45 is internally fitted with such agitator 46 revolving preferably at high speed and on the blades of which is directed a jet of a mixture of vapours or gases with liquids issuing for example from two or more nozzles or similar means. The carrier medium, for example vapours or gases, is supplied through pipes 47 and 48 containing the pipes 49 and 50 respectively, through which the liquids are supplied at a suitable pressure and issue from the nozzle-like opening mixed with the said gases or vapours. The mixture impinges upon the revolving blades and is converted into a more or less fine mist in accordance with the speed of revolution of the agitator or atomizer. Thus the composition of the mist may be widely varied by proportioning the quantities of carrier medium and liquid supplied to the apparatus. The mist thus prepared is led away through the medium of the pipe 51 the upper end of which is above the floor of the container 45. Any liquid collecting on the said floor may be intermittently drained off through the pipe 52. The atomizer 46 may be driven from outside in any suitable way. The gases or vapours used as a carrier may if necessary be used for operating the atomizer. To this end, the spindle of the atomizing means is hollow (Figure 10) and the gases or vapours forced therethrough issue laterally from the tips of the blades, and the said atomizer thus working after the fashion of a rotary sprinkler, as illustrated in Figure 10, in which the hollow spindle or support 53 is fitted with hollow blades having reaction nozzles 54 and 55.

The rotary blades may be replaced by an atomizing device as illustrated in Figure 11 and similar to a reaction turbine. The mixture of gas and liquid impinges upon an upwardly tapering or conical rotor 56 and is laterally deflected on to a toothed ring 56' or a dividing grid or suitable atomizing surfaces or the like on which the liquid is finally reduced to a mist.

The arrangement of Figure 11 may be further improved more particularly when vapours such as for example superheated steam are used as a carrier medium. In this case the mixture of vapour and liquid is allowed to expand in an ante-chamber 57 (mounted on the supply pipe) before the said mixture enters the atomizing chamber 45 proper, so that a portion of the steam suddenly expands and is therefore condensed, i. e. converted into a mist. The formation of a condensate or mist may be expedited by passing the mixture through a cooler 58 located before the chamber in which the mist is produced. This cooler or condensation-accelerating device can be replaced by suitable expansion or cooling rods coming into action after the mist is produced and whereby the mist is made denser by a further removal of liquid from the carrier steam or vapour. Figure 11 illustrates a device serving this purpose and consisting in a tubular cooler 59 mounted within the atomizing or mist-producing chamber.

Figures 13, 14:
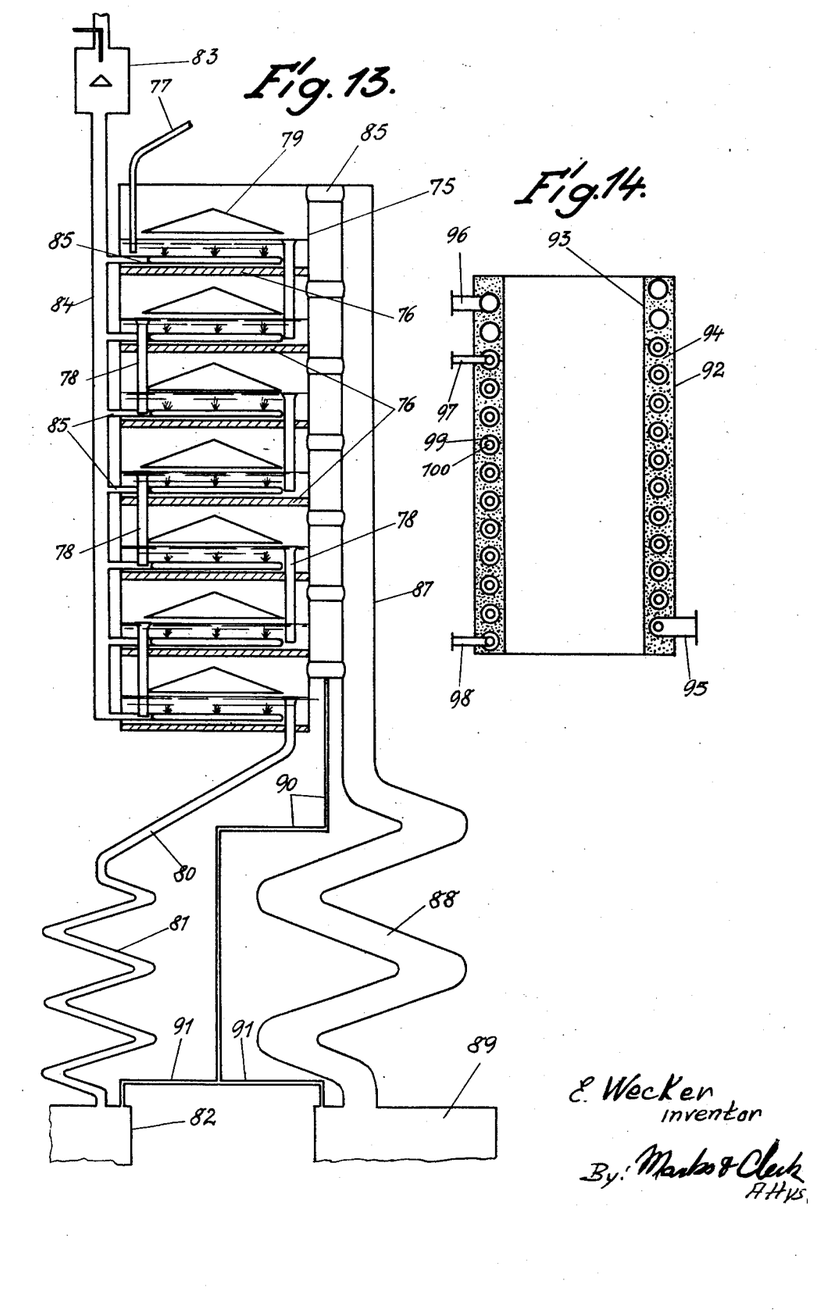

Figure 12 shows an atomizing or mist-producing apparatus differing from those hereinbefore described in that an injector-like device is used for mixing the carrier medium and the liquid and for supplying the mixture to the atomizing chamber. The gaseous or vapour-like carrier medium flows through the pipe 60 surrounded by the injector 61 operated by the liquid to be atomized. A modified arrangement is shown in Figure 13 in which the mist is produced in a chamber which is separate from the atomizing chamber 62 fitted with a bladed agitator or a turbine-like device 63, the mixture of vapour and liquid being obtained with the aid of a nozzle 64 or an injector or any other convenient means. The liquid in excess runs out at 65. A steam or gas blower 66 draws the atomized liquid into the mist-producing or expansion chamber proper (67) in which the mist is rendered homogeneous by a screw 68 or similar means and is propelled towards the outtake 69. Finally, Figure 14 is a view of mist-producing device comprising an expansion chamber 70 in which an atomizing member 71, not unlike the rotor of a turbine, is adapted to revolve. Steam is supplied to the expansion chamber with the aid of the pipe 72 and of the tubular coil 73 partially immersed in the cooling liquid 74, the said steam being blown against the atomizing member, so that the condensate blown out of the steam coil is converted into a mist. A vacuum is preferably maintained in the expansion chamber so that vacuum vapour is intensely produced in the receptacle 70 from the liquid surrounding the steam coil. The vapour produced in a vacuum is mixed with the mist and flows with the latter to the reaction apparatus.

Porous elements such as Berkefeld filtering candles may be used with advantage as out-take and atomizing members for the liquids and for the mixture of gases and liquids, so that the liquids converted into mist are in the highest state of division when coming in contact with the material to be treated. Thus the liquids passed through these candles are divided to uttermost fineness and reach the reaction mixture in the form of extremely fine particles. One of the advantages of this construction is that if the pores of the filtering candles are sufficiently fine the carriers need not be used and it is sufficient to force the liquids at a suitable pressure through the atomizing elements.

The whole of the apparatus may be worked in a considerably simplified manner by grouping at one control centre the various means for regulating the temperature, the pressure, the inflow and outflow of the oil, the rate of cooling, the vacuum, etc., so that the progress of the work in the whole plant is clearly displayed at one point and may be controlled therefrom.

Figures 15, 16:
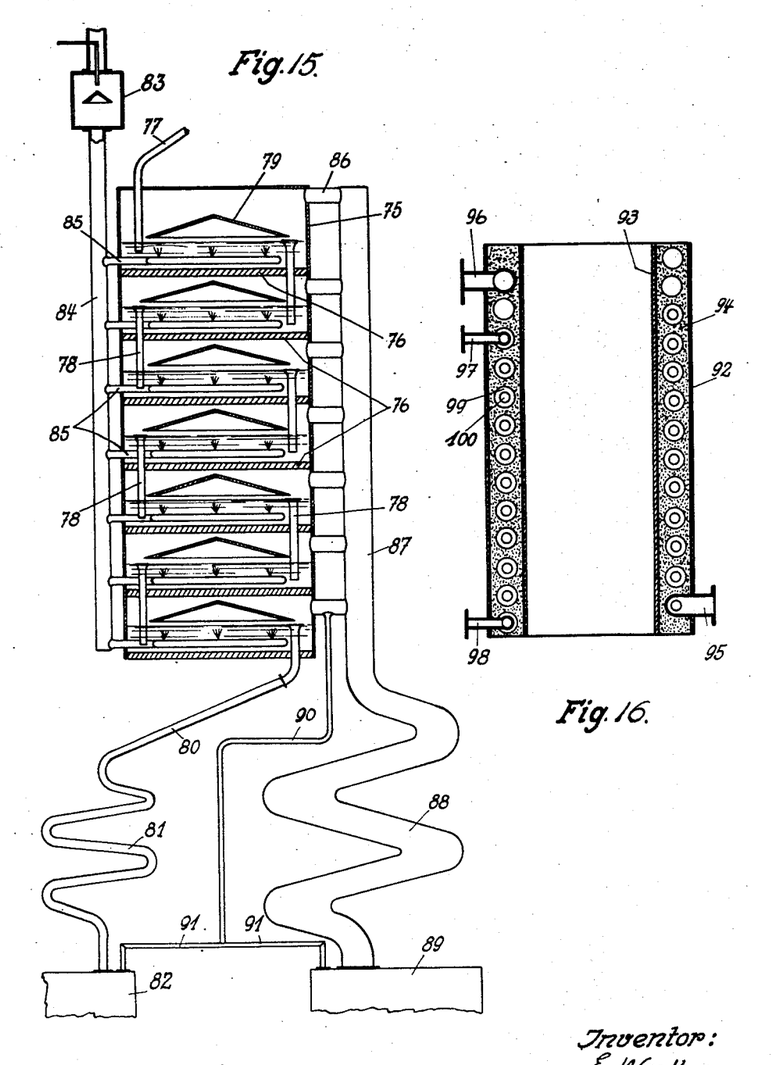
Figure 15 shows in vertical cross-section another modification of the apparatus in which the chambers are in superposed relation and Figure 16 shows in vertical cross-section a modification of a preheater for the oils.

The constructions of the apparatus described are examples which may be modified in a variety of ways without departing from the invention. Referring for example to Figure 15, the various elements shown therein form a vertical lay-out in which the reaction vessel 75 is divided into a number of superposed compartments by horizontal partitions 76, and may be heated in any convenient manner, although preference is given to the method of making the floors or partitions 76 into heating members, for which purpose they are for example designed as electrically heated plates. The raw material is supplied to the upper end of the reaction vessel 75 through a pipe 77. The various compartments are in communication through overflows 78 and are provided with screens 79 or the like to prevent the material from being sprayed into the discharge pipes. The oil or fat flows through the pipe 80 out of the lowermost compartment, passes through an oil cooler 81 and reaches the storage tank 82. The spray-forming liquid is converted into a mist in a suitable device 83 (for example one of those described in the foregoing) and is mixed with carriers if necessary, whereafter it is supplied to the reaction compartments through the pipe 84 and the branching-off pipes 85. The vapours produced in the various compartments are discharged through pipes 86 into a common pipe 87 and after traversing a cooler 88 are collected in a receiver as condensate. Vacuum-equalizing piping 90, 91 is preferably provided. The apparatus just described differs from known vertical or column apparatus in that each compartment is separately heated, has its own means of communication with the vapour collector or main pipe and also its own pipe for the supply of fresh mixture of mist and vapour.

Figure 16 illustrates a construction of a pre-heater essentially differing from that of Figure 8 in that the heat-exchanging element is a double tubular coil the two component pipes of which are disposed concentrically one within the other. An annular space 94 is formed between two concentric cylinders 92 and 93 and is filled with heat-insulating material, for example diatomaceous earth, in which the above-mentioned double coil is embedded, the said coil being traversed by the raw material and by that flowing out of the reaction apparatus, as will appear hereunder. The raw material enters the pre-heater through the pipe 95 and rises therein to the outlet end 96 whence it flows, in a heated condition, to the reaction apparatus. The material leaving the latter is preferably caused to flow downwardly in the pre-heater and therefore on the counter-current principle relatively to the raw material. The material leaving the reaction apparatus is led in through the pipe 97 and is let out of the pipe 98 at a lower temperature. The cross-sectional areas of the concentric pipes are shown at 99 and 100, the treated material flowing downwardly through the pipe 100 and the raw material rising in the annular space between the said pipes 99 and 100. The heat exchange in the pre-heater just described is very efficient while the dimensions of the apparatus are comparatively small. The treatment of oils and fats with the aid of the various apparatus and methods described in the foregoing has the particular advantage that in many cases the material is simultaneously de-acidified and extensively de-odorized in one operation. In this connection it is possible and advantageous either to carry out the whole of the purification and de-odorization steps according to the present invention, or to combine the latter with known processes. For example, the material may be bleached, or purified with chemical or adsorptive agents before it is treated with water mist. Moreover the treatment according to this invention may be combined with processes for physically or chemically acting upon the material treated. For example the colouring matter in colloidal solution may be flocculated before, during or after treatment with mists from liquids, by an addition of coagulating substances such as albumen, pectine, or the like which produce de-hydration or partial carbonization, the flocculation being accelerated or intensified by the expansion of the mist from liquids. Thus the colour of oils and fats may be favourably altered by introducing hydrogen peroxide or sulphurous acid simultaneously with the mists from liquids. Furthermore, it may be advantageous to add in certain cases catalytic reagents to the oils and fats before or during treatment. Also the portions of the apparatus in contact with oils and fats, i. e. the inner walls of the treating vessels, the dividing ribs, etc., may if necessary be made of or coated with catalytically acting materials such as for example metals.

Claims:

1. In an apparatus for separating liquids of different volatility, the combination of at least one chamber adapted to contain liquids to be treated, a heating device to heat liquid contained in said chamber, a spray pipe arranged in the lower part of said chamber, a liquid overflow pipe terminating in said chamber, a cooler connected with said overflow pipe, a tank in communication with said cooler to collect liquid flowing out of said chamber and through said overflow pipe and cooler, a vapor pipe leading from the upper part of said chamber, a cooler connected with said vapor pipe to cool vapors formed in said chamber, a collecting vessel connected with said last mentioned cooler, and vacuum equalizing pipes connecting said vapor pipe with said tank.

2. In an apparatus for separating liquids of different volatility, a plurality of chambers having their upper spaces and lower spaces in communication with each other and adapted to contain liquid to be treated, a scrubber associated with said chambers to scrub vapors coming from said chambers, a heating device to heat liquid contained in said chambers, spray pipes arranged in the lower part of said chambers, a liquid overflow pipe associated with one of said chambers, a cooler connected with said overflow pipe, a tank in communication with said cooler to collect liquid flowing out of said chamber and through said overflow pipe and cooler, a vacuum equalizing pipe connecting the upper space of said chambers with said tank to equalize pressures therein, a cooler connected with the upper space of said scrubber, a collecting vessel connected with said last mentioned cooler, and a vacuum equalizing pipe connecting the upper space of said scrubber with said collecting vessel.

3. The apparatus as claimed in claim 2 in which the lower portions of the chambers are internally subdivided by longitudinal and transverse ribs to form a plurality of chambers, said transverse ribs being provided with apertures.

4. The apparatus as claimed in claim 2 in which the walls of the chambers are made of a metal having a heat conductivity at least equal to aluminum.

5. The apparatus as claimed in claim 2 in which the inner surfaces of the chambers are composed of a material chemically inert to oils and fats.

6. The apparatus as claimed in claim 2 in which the upper inner surfaces of the chambers are composed of a material having low heat conductivity.

7. In combination with the apparatus claimed in claim 2, a preheater to preheat liquids entering the chambers.

In testimony whereof I affix my signature.

ERNST WECKER.